United States Patent [19]

Collins

[11] Patent Number: 4,546,237
[45] Date of Patent: Oct. 8, 1985

[54] WALL-MOUNTABLE SINGLE CUP ELECTRIC LIQUID HEATING APPLIANCE

[75] Inventor: Harry F. Collins, Minneapolis, Minn.

[73] Assignee: Service Ideas, Inc., Minneapolis, Minn.

[21] Appl. No.: 548,083

[22] Filed: Nov. 2, 1983

[51] Int. Cl.⁴ ............................................. H05B 1/02
[52] U.S. Cl. .................... 219/331; 219/297; 219/337; 219/437; 219/523
[58] Field of Search ........ 219/297, 331, 328, 335–337, 219/437, 523

[56] References Cited

U.S. PATENT DOCUMENTS

| | | | |
|---|---|---|---|
| 1,680,743 | 8/1928 | Leevers | 219/437 |
| 2,589,473 | 3/1952 | Belluci | 219/523 X |
| 2,972,037 | 2/1961 | Taves | 219/328 |
| 3,079,485 | 2/1963 | Groves | 219/328 |
| 3,121,783 | 2/1964 | Blanchard | 219/523 |

FOREIGN PATENT DOCUMENTS

| | | | |
|---|---|---|---|
| 826231 | 10/1969 | Canada | 219/523 |
| 1039669 | 9/1958 | Fed. Rep. of Germany | 219/523 |
| 1019922 | 2/1966 | United Kingdom | 219/523 |
| 1436371 | 5/1976 | United Kingdom | 219/523 |

*Primary Examiner*—Anthony Bartis
*Attorney, Agent, or Firm*—Williamson, Bains, Moore & Hansen

[57] ABSTRACT

A single cup electric heating device for heating a cup of tea, coffee or the like includes a generally vertically oriented mounting support having a flat rear surface adapted to be mounted on the wall of a motel room, hotel room or the like. The mounting support has a horizontal cup holder at its lower end for supporting the cup to be heated. Cooperating guides on the cover and sides of the mounting support slidably guide the cover for shifting movement between a raised position permitting a cup to be placed on the cup holder and a lowered position covering a cup so placed. An electric immersion heating element carried by the cover is immersed in the contents of the cup when the cover is in the lowered position and is energized by cooperating electrical contacts on the cover and mounting support which engage in the lowered cover position. An electromagnetic retaining mechanism simultaneously energized with the heating element retains the cover in its lowered position. A thermostat in the cover responsive to the temperature of the cup contents simultaneously deenergizes the heating element and retaining mechanism when the cup contents are heated to apredetermined degree and a spring returns the cover to its raised position.

12 Claims, 4 Drawing Figures

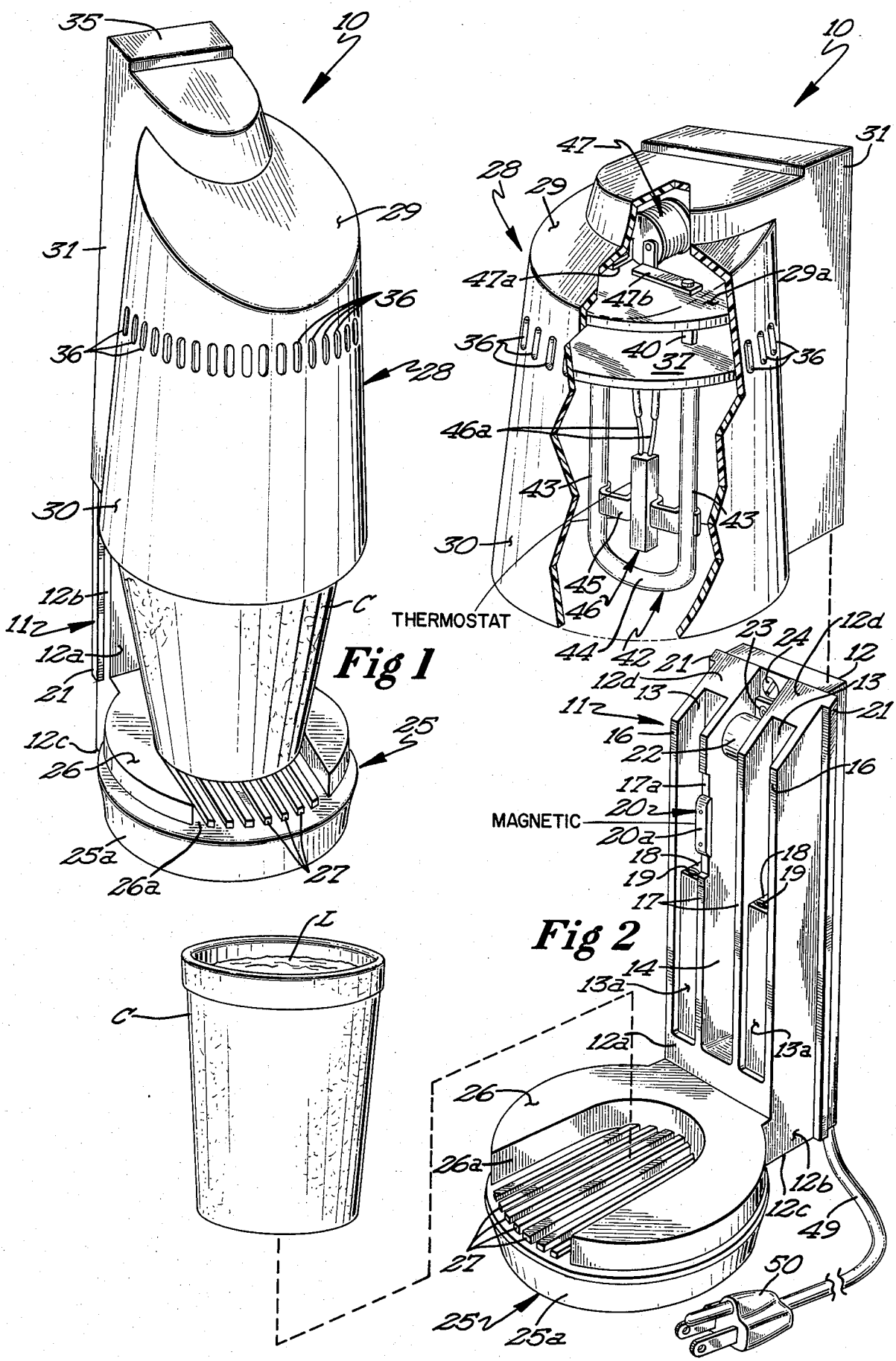

WALL-MOUNTABLE SINGLE CUP ELECTRIC LIQUID HEATING APPLIANCE

SUMMARY OF THE INVENTION

This invention relates to an appliance for making hot drinks, such as coffee, tea and the like, and more particularly to an appliance device for heating a beverage contained in a single cup.

There are prior art heating appliances for heating the contents of a container through the use of a heating probe which is inserted directly into the liquid contents. However, most of these prior art devices are somewhat cumbersome and are of questionable safety in their use, and are therefore not adaptable as a reasonably inexpensive appliance to be installed in motels, hotels and the like.

It is therefore a general object of this invention to provide a novel electrical device, of simple and inexpensive construction and operation, which may be applied to a single cup for quickly, safely and effectively heating the contents thereof. The electrical device is therefore especially adapted for use in heating instant coffee, tea and the like.

Another object of this invention is to provide a novel electrical device for heating the contents of a cup by an electrical probe carried by a cover which completely covers the cup during the heating step to thereby reduce, if not preclude, the likelihood of injury from electrical shock or spilled content from the cup.

A further object of this invention is to provide a novel single cup heating device arranged and constructed for mounting on a wall or the like, thereby making the appliance especially adapted for use in hotels, motels and the like.

These and other objects and advantages of the invention will appear more fully from the following description made in conjunction with the accompanying drawings wherein like reference characters refer to the same or similar parts throughout the several views.

FIGURES OF THE DRAWING

FIG. 1 is a front perspective view of a cup in place and with the carrier in a raised position;

FIG. 2 is an exploded front perspective view of the novel heating device;

DESCRIPTION OF THE PREFERRED EMBODIMENT

Figure 4:
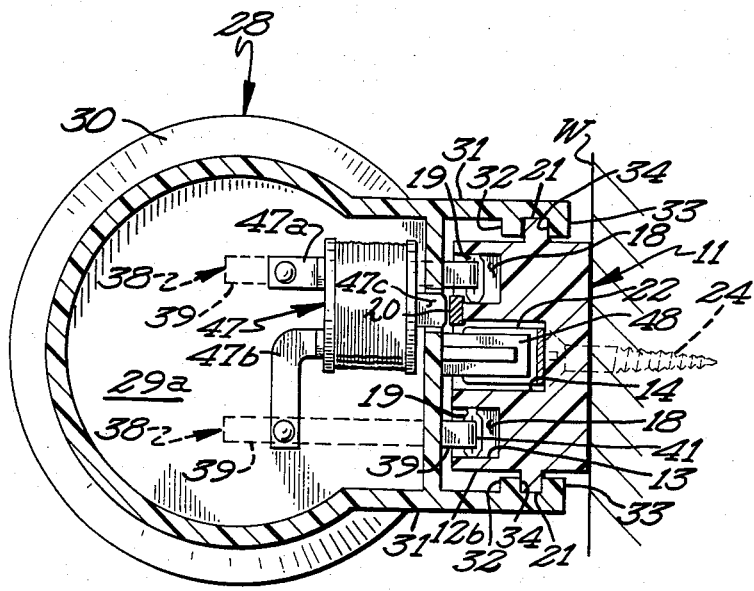
FIG. 4 is a transverse section with the carrier in a lowered position taken along lines 4—4 of FIG. 3.

Referring now to the drawings, and more specifically to FIG. 1, it will be seen that one embodiment of the novel single cup heating device, designated generally by the reference numeral 10, is thereshown. The heating device is adapted to be mounted on the wall of a motel room, hotel room or the like, and includes a vertically oriented, generally rectangular shaped mounting support or member 11 which is formed of a suitable plastic material. The mounting support 11 has a substantially flat rear vertical surface 12, a flat front surface 12a, opposed flat side surfaces 12b, a flat lower surface 12c, and an inclined upper surface 12d.

The front surface of the mounting member 11 is provided with a pair of vertical, substantially parallel outer recesses 13 therein, and an inner vertical recess 14 located between the outer recesses. It will be noted that the lower end of the recesses are spaced upwardly from the lower surface 12c of the mounting member and that the outer recesses 13 define outer ribs 16. The outer recesses also cooperate with the inner recess to define a pair of laterally spaced apart, substantially parallel inner ribs 17. It will be noted that one of the inner ribs 17 is provided with a notch 17a therein intermediate the vertical extent thereof. It will also be noted that the lower end portions 13a of the outer recesses have a depth dimension less than the depth dimension of the remaining portions of the recesses to thereby define upwardly facing shoulders 18. Each of the shoulders has an upwardly facing female type electrical contact 19 therein. The female contact elements are molded in during the molding of the mounting member. The notch 17a in one of the inner ribs 17 accommodates a magnetic element 20 thereon. It is pointed out that the outer surface 20a of the magnetic element 20 is co-planar with the front surface 12a of the mounting support 11.

The mounting member 11 is also provided with a pair of vertical ribs 21 which project laterally outwardly from the side surfaces 12b thereof and extend throughout the vertical dimension of the mounting member. These ribs define vertical guides, the use of which will be more fully described herein below. The mounting member is also provided with a coiled leaf spring 22 which has one end thereof secured by a screw 23 against the forwardly facing surface defined by the inner recess 14 adjacent the upper end of the mounting member. The mounting member is also provided with an opening at its upper end to accommodate a screw 24 to thereby permit the mounting member to be attached to a wall of a room in a motel or hotel.

The mounting member is also provided with a generally circular, horizontal cup support 25 which is integral with the lower end of the mounting member and projects laterally outwardly therefrom. The cup support is provided with an arcuate or crescent shaped cup retaining flange 26 which projects upwardly therefrom. It will be noted that the cup retaining flange 26 is spaced inwardly from the circumferential surface 25a of the cup support 25. It will further be noted that the cup retaining flange 26 has a forwardly facing opening 26a therein to permit a cup to be moved laterally through the opening. The upper surface of the cup support 25 is provided with ribs 27 to permit liquid which may boil over or spill from the cup to flow between the recesses defined between the ribs.

The heating device 10 also includes a vertically disposed cover 28 which is slidably mounted on the mounting member and which includes an inclined top wall 29 having a continuous wall or skirt 30 flaring downwardly and outwardly therefrom. The cover 28 is also formed of the same plastic material as the mounting member 11. The cover 28 is provided with a pair of rearwardly projecting, laterally spaced apart, substantially parallel flanges 31 which are integral with the wall 30 and project rearwardly therefrom. Each of the flanges 31 is provided with an inner vertical lip 32 and an outer vertical lip 33 to define a vertical guideway 34 therebetween. The laterally projecting vertical guides 21 on the mounting member are engaged in the guideways 34 to mount the cover for vertical sliding movement relative to the mounting member 11.

Figure 3:
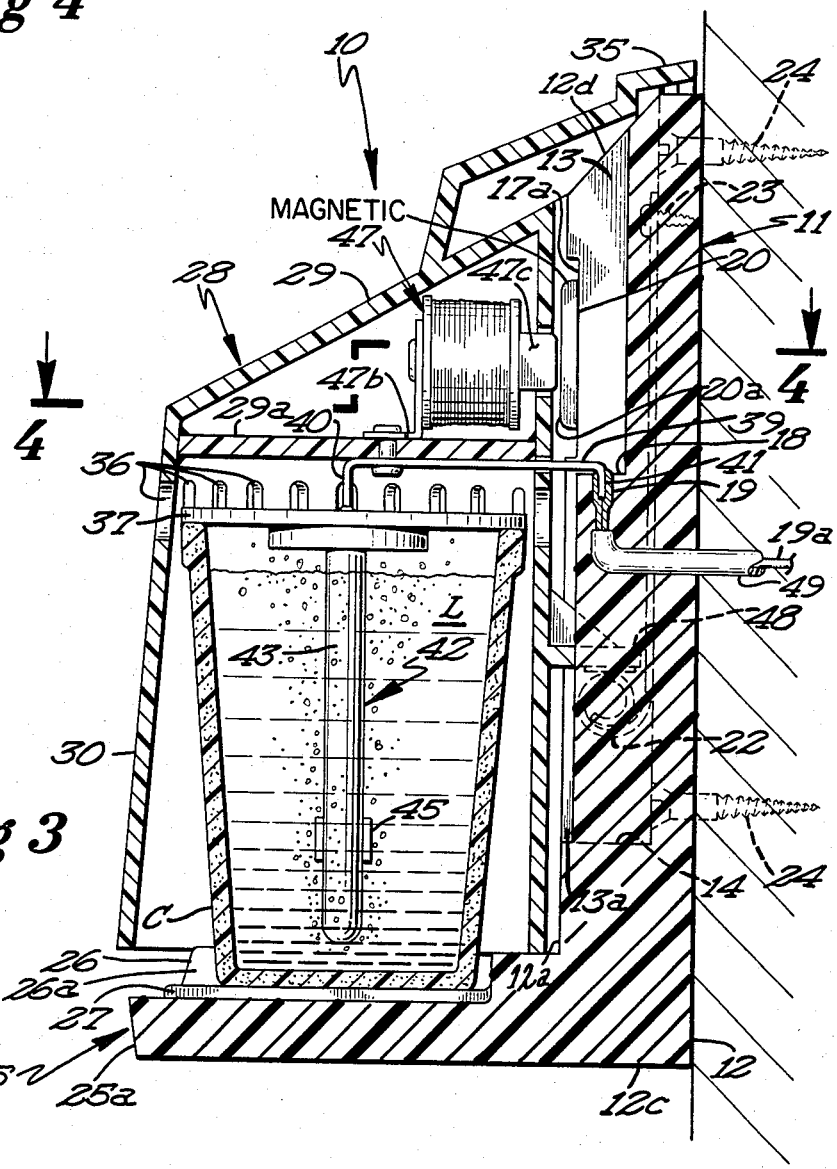
FIG. 3 is a cross-sectional view of the heating device with the carrier in a lowered position and in a heating mode with respect to the contents of the cup.

Referring now to FIG. 3, it will be seen that the cover 28 is provided with a transverse top wall 35 extending between the flanges 31, and it will further be noted that the flared wall 30 is provided with ventilation openings 36 therein arranged in circular fashion adjacent the upper end of the cover. The cover is also provided with a transverse horizontally oriented wall 37 spaced below the inclined top wall 29, as best seen in FIG. 3. A pair of similar L-shaped electrodes 38 are provided, each including a horizontal portion 39 and a vertical portion 40 which project through the transverse wall 37. It will be noted that the horizontal portion 39 of each L-shaped electrode extends in a fore and aft direction and projects rearwardly from the wall 30. The rear end of each horizontal portion 39 terminates in downturned male contacts which are adapted to engage the female conacts 19 on the mounting member 11. The electrodes are also molded in place during the molding of the cover.

A U-shaped heating element 42 projects downwardly from the transverse wall 37 and includes a pair of vertically oriented, substantially parallel legs 43 integral with the bight portion 44. Downwardly projecting electrode segments 40 are electrically connected to the top ends of heating element legs 43. The thermostat 46 is secured to the legs 43 of the heating element by means of spacers or mounting elements 45. The spacers thermally insulate the thermostat from the heating element. Electrical conducators 46a electrically interconnect the thermostat 46 and L-shaped electrodes 38. In this regard, at least one of the electrodes is connected in series with the heating element 42 and the thermostat 46.

Referring again to FIG. 3, it will be seen that an electromagnet 47 is mounted on the upper surface of a transverse wall 29a and includes an iron core 47c which projects outwardly through an opening in the cover. Wall 29a extends horizontally inside of cover 28 above transverse wall 37. The electromagnet 47 is also connected in series with the electrodes 38, the heater element 42 and the thermostat 46 by means of connectors 47a and 47b. A generally horizontally oriented, rearwardly projecting, engaging tab 48 is secured to the flared wall 30 of the cover and projects rearwardly therefrom between the flanges 31. It will be noted that the tab 48 is located below the downturned male contacts 41 of the electrode 38. The tab 48 is engageable with the coil spring 22, the latter serving to yieldably resist downward movement of the cover.

In operation, the mounting member 11 will be mounted on a vertical wall at a suitable location in a motel or hotel room. The mounting member 11 is provided with an electrical conductor cord 49, which may extend through the bottom of mounting member 11 and have a conventional bayonet type plug 50 secured thereto. Such an arrangement for connection to a standard wall outlet is shown in FIG. 2. Alternatively, conductor 49 may be connected directly within a wall to the building power supply. The electrical conductor cord 49 is electrically connected to the socket elements 19 on the mounting member 11 through lead wires 19a; and when connected to a conventional wall outlet or power supply, the heating device will be conditioned for use. It will be noted that the cover 28 will be urged to a raised position, as illustrated in FIG. 1, by the action of the coiled leaf spring 22 engaging the spring engaging tab 48. A user will place the cup containing the beverage to be heated on the cup support 25 so that the bottom of the cup will be positioned on the ribs 27 and will be received and restrained within the cup retaining flange 26. The cup may contain water for use with instant coffee, tea bags or the like, or it may contain a beverage to be heated. The user will move the cover downwardly, and this downward movement is yieldably resisted by the leaf spring 22. The downward movement will continue until the male contact elements 41 engage the female contacts 19 thereby closing the circuit and energizing the heating element 42. The electromagnet 47 will also be energized and its core 47a will be activated to engage the magnet 20 and thereby lock the cover in a lowered position.

It will be noted that when the cover is in the lowered position, the lower peripheral edges thereof will extend downwardly beyond the cup retaining flange 26. This arrangement prevents injury to the user from boiling water or from inadvertently contacting the heating element during the heating operation. The liquid within the cup will be heated by the heating element until the liquid reaches a predetermined temperature to operate the thermostat 46. Opening of the thermostat also de-energizes the heating element and the electromagnet, and the leaf spring 22 will then move the cover to its upper position permitting a user to remove the cup of heated beverage.

From the foregoing description, it will be seen that the novel single cup heating device contains features which make the device safe and effective for use in heating a beverage so that the device has special utility as an adjunct appliance in hotel or motel rooms. The vertically shiftable cover assures a user that the liquid to be heated is completely covered and shielded during the heating step so that there is little, if any, danger of the user being injured by spilled heated liquid or by shock from the electric heating element.

It will be seen that the simple, compact construction of the heating device permits the device to be easily operated by merely moving the cover to the lowered position until the circuitry for the device is energized. The electromagnet retains the device in the lowered position until the liquid beverage is heated to the desired degree, at which time the electromagnet is de-energized and the cover is urged to the raised position. With this arrangement, the heating element is at all times shielded from the user when the circuit to the heating element is energized.

Thus it will be seen from the foregoing description that I have provided a novel single cup heating device, which is not only of simple and inexpensive construction and operation, but one which functions in a more efficient manner than any heretofore known comparable devices.

While the preferred embodiments of the present invention have been described, it should be understood that various changes, adaptions and modifications may be made therein without departing from the spirit of the invention and the scope of the appended claims.

What is claimed is:

1. A single cup heating device for quickly heating a liquid beverage, such as coffee, tea, or the like, contained within a cup, comprising:
   an upright, generally straight-walled support having a flat, rear vertical surface and a pair of vertically extending, opposed side surfaces;
   a horizontal cup holder affixed to the lower end portion of said support and projecting laterally therefrom for supporting a cup thereon containing a beverage to be heated, said cup holder defining with said upright support a generally L-shaped support pedestal;

a cover having a top wall and a continuous, generally vertical wall depending downwardly therefrom, and cooperating means on said support and said cover mounting said cover for vertical shifting movement relative to said cup holder between a raised position permitting a cup to be place on said cup holder and a lowered position in covering relationship to a cup placed on said cup holder, said downwardly depending wall comprising a skirt-like enclosure with wall means which enclose a cup on said cup holder when said cover is in said lowered position, and said cover further comprising a pair of laterally spaced wall segments projecting outwardly from said skirt-like enclosure towards said upright support in embracing relation to said opposed side surfaces thereof, with the space between said laterally spaced wall segments of said cover being open, whereby said flat, rear vertical surface of said upright support remains uncovered for flat mounting against a wall surface;

a heating element secured to the interior of said cover, said cover when in said raised position being spaced above the cup supported on said cup holder, and when in said lowered position being positioned over the cup in covering relation therewith so that said heating element projects into the liquid beverage in the cup;

circuit means connected to a source of electrical current including electrical contacts on said support;

electrical contacts on said cover electrically connected with said heating element and movable into engagement with said contacts on said support to energize said heating element and heat the liquid beverage by movement of said cover to its lowered position, and thermally responsive control means on said cover operable when said cover is in the lowered position to de-energize said heating element in response to the temperature of the liquid beverage within the cup reaching a predetermined temperature.

2. The single cup heating device as defined in claim 1 wherein said horizontal cup holder is provided with an upwardly projecting cup engaging flange engaged by a cup positioned on said holder, the lower edge portions of said cover being positioned exteriorly of and projecting downwardly beyond the upper periphery of the cup-engaging flange when the cover is in the lowered position.

3. The single cup heating device as defined in claim 2 wherein said flange has a cup receiving opening along one peripheral edge thereof to permit the lateral positioning of a cup on said cup holder and the lateral withdrawal of the cup therefrom after the liquid contents of the cup are heated.

4. The single cup heating device as defined in claim 1, and yieldable means on said support engaging said cover for normally urging said cover to said raised position, and cooperating retaining means on said cover and support for releasably retaining said cover in the lowered position, said retaining means comprising an electromagnetic mechanism which is energized in conjunction with said heating element to hold said cover in said lowered position and which is de-energized by said thermally responsive control means when it de-energizes said heating element to release said cover for return to its normal position under the urging of said yieldable means.

5. The single cup heating device as defined in claim 4 wherein said electromagnetic mechanism comprises a magnetic element at a predetermined vertical location on the front face of said upright support, and a magnetic core carried on said cover and projecting generally horizontally therefrom towards said upright support, said magnetic core being vertically positioned on said cover to confront said magnetic element and magnetically latch said cover down when said cover is in said lowered position.

6. The single cup heating device as defined in claim 1, and yieldable means on said support engaging said cover for normally urging said cover to said raised position, and cooperating retaining means on said cover and support for releasably retaining said cover in said lowered position, said yieldable means comprising a coil spring on said support, and a spring engaging element on said cover projecting therefrom towards said upright support and engaging said coil spring and progressively unwinding said spring when said cover is shifted to said lowered position, said coil spring urging said cover to said raised position upon release of said retaining means.

7. The single cup heating device as defined in claim 1, and further comprising vertically extending guide means on the outside of each of said vertically extending, opposed side surfaces of said upright support, and mating guide members on the inside of said laterally spaced wall segments of said cover cooperatively engaging said guide means for guiding the vertical shifting movement of said cover relative to said cup holder.

8. The single cup heating device as defined in claim 1 wherein said electrical contacts on said cover comprise a pair of laterally spaced apart electrodes projecting laterally rearwardly towards said upright support, and said electrical contacts on said support comprise a pair of electrical contacts mounted on said upright support in the vertical path of movement of said electrodes for circuit closing engagement therewith by movement of said cover to said lowered position.

9. The single cup heating device as defined in claim 8, and further including a pair of laterally spaced, vertical recesses on said upright support in which said electrodes are free to travel upwardly and downwardly with said cover, and said pair of electrical contacts being positioned at the bottom of said vertical recesses at vertical locations on said upright support coinciding with the position of said electrodes when said cover is in said lowered position.

10. The single cup heating device as defined in claim 9, and further including yieldable means on said support engaging said cover for normally urging said cover to said raised position, said yieldable means comprising a coil spring on said support, and a spring engaging element on said cover projecting therefrom towards said upright support and engaging said coil spring and progressively unwinding said spring when said cover is shifted to said lowered position; and an additional vertically extending recess on said upright support between said pair of laterally spaced recesses within which said coil spring is mounted for upward and downward uncoiling and coiling movement.

11. A single cup heating device for quickly heating a liquid beverage, such as coffee, tea, or the like, contained within a cup, comprising:

an upright, generally straight-walled support;

a horizontal cup holder affixed to the lower end portion of said support and projecting laterally therefrom for supporting a cup thereon containing a beverage to be heated, said cup holder defining with said upright support a generally L-shaped support pedestal;

a cover having a top wall and a continuous, generally vertical wall depending downwardly therefrom, and cooperating means on said support and said cover mounting said cover for vertical shifting movement relative to said cup holder between a raised position permitting a cup to be placed on said cup holder and a lowered position in covering relationship to a cup placed on said cup holder, said downwardly depending wall comprising a skirt-like enclosure with wall means which enclose a cup on said cup holder when said cover is in said lowered position;

a heating element secured to the interior of said cover, said cover when in the raised position being spaced above the cup supported on said cup holder, and when in the lowered position being positioned over the cup in covering relation therewith so that said heating element projects into the liquid beverage in the cup;

circuit means connected to a source of electrical current including a pair of electrical contacts mounted on said upright support;

a pair of laterally spaced apart electrodes carried on said cover, electrically connected with said heating element, and movable into engagement with said contacts on said support to energize said heating element and heat the liquid beverage by movement of said cover to its lowered position, and thermally responsive control means on said cover operable when said cover is in the lowered position to de-energize said heating element in response to the temperature of the liquid beverage within the cup reaching a predetermined temperature; and a pair of laterally spaced, vertical recesses on said upright support in which said electrodes are free to travel upwardly and downwardly with said cover, and said pair of electrical contacts being positioned at the bottom of said vertical recesses at vertical locations on said upright support coinciding with the position of said electrodes when said cover is in said lowered position.

12. The single cup heating device as defined in claim 11, and further including yieldable means on said support engaging said cover for normally urging said cover to said raised position, said yieldable means comprising a coil spring on said support, and a spring engaging element on said cover projecting therefrom towards said upright support and engaging said coil spring and progressively unwinding said spring when said cover is shifted to said lowered position; and an additional vertically extending recess on said upright support between said pair of laterally spaced recesses within which said coil spring in mounted for upward and downward uncoiling and coiling movement.

* * * * *